(12) United States Patent
Drummond

(10) Patent No.: US 10,047,879 B2
(45) Date of Patent: Aug. 14, 2018

(54) PIPE SUPPORT STRUCTURE

(71) Applicant: DOOSAN BABCOCK LIMITED, Crawley, Sussex (GB)

(72) Inventor: Phillip Drummond, Renfrew (GB)

(73) Assignee: DOOSAN BABCOCK LIMITED, Crawley, Sussex (GB)

( * ) Notice: Subject to any disclaimer, the term of this patent is extended or adjusted under 35 U.S.C. 154(b) by 0 days.

(21) Appl. No.: 15/312,071

(22) PCT Filed: Jun. 24, 2015

(86) PCT No.: PCT/GB2015/051838
§ 371 (c)(1),
(2) Date: Nov. 17, 2016

(87) PCT Pub. No.: WO2015/198043
PCT Pub. Date: Dec. 30, 2015

(65) Prior Publication Data
US 2017/0130872 A1    May 11, 2017

(30) Foreign Application Priority Data
Jun. 25, 2014 (GB) .................................. 1411237.9

(51) Int. Cl.
*F16L 3/00* (2006.01)
*F16L 3/02* (2006.01)
(Continued)

(52) U.S. Cl.
CPC *F16L 3/02* (2013.01); *F16L 3/18* (2013.01); *F16L 9/02* (2013.01); *F16L 57/06* (2013.01); *F16L 58/02* (2013.01)

(58) Field of Classification Search
CPC .................................. F16L 3/26; F16L 3/223
(Continued)

(56) References Cited

U.S. PATENT DOCUMENTS 3,980,262 A * 9/1976 Lee ........................... F16L 3/18
  248/49
4,899,963 A * 2/1990 Murphy ................. F16L 3/137
  24/16 R (Continued)

FOREIGN PATENT DOCUMENTS

DE    25 17 745 A1    10/1975
DE    42 13 893 A1    11/1993
(Continued)

OTHER PUBLICATIONS

International Preliminary Report on Patentability for International application No. PCT/GB2015/051838, dated Jan. 5, 2017, 7 pages.
(Continued)

*Primary Examiner* — Patrick F Brinson
(74) *Attorney, Agent, or Firm* — Sughrue Mion, PLLC

(57) ABSTRACT

A pipe support structure is described comprising a support member defining a support surface, and a plurality of pipe support elements; wherein the support surface defines a plurality of grooves each correspondingly sized and shaped to receive a respective one of the pipe support elements, with the pipe support element being sized to project beyond its groove when so received. The pipe support elements may then be fabricated from a material selected for instance for low friction, corrosion resistance or the like. A pipeline system, a method for supporting a pipe, and a method for deploying a pipeline system are also described embodying the same general principles.

18 Claims, 3 Drawing Sheets

Detail B

(51) Int. Cl.
*F16L 3/18* (2006.01)
*F16L 57/06* (2006.01)
*F16L 58/02* (2006.01)
*F16L 9/02* (2006.01)

(58) Field of Classification Search
USPC .............. 138/106, 103; 248/74.3, 65, 49, 55
See application file for complete search history.

(56) References Cited

U.S. PATENT DOCUMENTS

| | | | |
|---|---|---|---|
| 5,871,306 A | 2/1999 | Tilcox | |
| 6,073,891 A | 6/2000 | Humber | |
| 7,278,613 B2* | 10/2007 | Roy | F16L 3/02 138/106 |
| 7,328,724 B2* | 2/2008 | Britton | F16L 3/1091 138/106 |
| 9,027,605 B2* | 5/2015 | Williams | F16L 9/00 138/98 |
| 9,644,767 B2* | 5/2017 | Schutte | F16L 3/26 |
| 2007/0068588 A1 | 3/2007 | Britton | |
| 2009/0159759 A1* | 6/2009 | Ansperger | F16L 3/10 248/72 |
| 2010/0294389 A1* | 11/2010 | Souza | F16L 3/02 138/110 |
| 2014/0366978 A1* | 12/2014 | Kristiansen | F16L 3/02 138/106 |

FOREIGN PATENT DOCUMENTS

| | | | |
|---|---|---|---|
| GB | 2 099 289 A | 12/1982 | |
| GB | 2099289 A * | 12/1982 | .............. F16L 3/13 |
| GB | 2 175 667 A | 12/1986 | |
| WO | 2013/122481 A1 | 8/2013 | |

OTHER PUBLICATIONS

United Kingdom Search Report for GB1411237.9 dated Dec. 18, 2014 [PCT/ISA/210].
International Search Report for PCT/GB2015/051838 dated Aug. 28, 2015 [PCT/ISA/210].
Written Opinion for PCT/GB2015/051838 dated Aug. 28, 2015 [PCT/ISA/237].

* cited by examiner

Detail B

PIPE SUPPORT STRUCTURE

CROSS REFERENCE TO RELATED APPLICATIONS

This application is a National Stage of International Application No. PCT/GB2015/051838, filed on Jun. 24, 2015, which claims priority from British Patent Application No. 1411237.9, filed on Jun. 25, 2014, the contents of all of which are incorporated herein by reference in their entirety.

BACKGROUND

The invention relates to a support structure for a pipe and to a method for providing such a support structure for a pipe. The method in particular relates to a support structure and method which offers a reduced tendency to produce mechanical damage at the point of contact between the support and the pipe and/or a reduced tendency to create a corrosion site at the point of contact between the support and the pipe.

The invention in particular relates to a support structure for a pipe to form part of an industrial pipeline system such as might be required for the transport of fluids in, around and between large scale industrial facilities such as chemical and petrochemical plants, power generation facilities and the like.

The invention in particular relates to a support structure and method for the support of pipelines fabricated from pipeline steel and other similarly potentially corrodible materials.

Various industrial applications exist where it becomes necessary to construct a network of pipelines for the long distance transport of liquids and gases at ambient or elevated temperatures, for example in conjunction with various industrial applications. A typical pipeline construction consists for instance of a plurality of pipes connected end to end, of suitable structural material and for example structural steel. These may be retained stably in position, and for example supported on the ground or another surface, by provision of a plurality of support plates with a first face in contact with and supporting a pipe and a second opposing face held by a suitable support structure, such as support leg engaging the ground or another surface along which the pipeline is run. The pipe is supported for example by being seated in face-to-face contact with a first face of the support plate and; or by being clamped thereon. Such support plates are generally known, and might for example have an arcuate configuration sized and shaped for face-to-face contact with a corresponding shaped lower surface of a cylindrical pipe.

Pipelines to which the prior art structures and the structures of the invention relate are typically envisaged to be exposed to mild to moderate corrosive conditions, for example by being in an external ambient environment and subject to adverse weather conditions, and possibly in the case of application in coastal areas or offshore subject to the corrosive effects of seawater. Galvanic reaction between dissimilar metals making up the pipeline and support plate may also have a detrimental role.

To mitigate this, pipes fabricated from steel or the like are typically provided with anti-corrosion coatings, anti-corrosion paints or the like applied to an external surface.

Even so, two problems in particular can arise with simple prior art supports in which a lower part of the pipe is supported, and for example clamped, at a contact region on an upper surface of a support plate.

First, potentially corrosive materials from the external environment, such as water and saline solution and the like, tend to accumulate in the contact region where the lower surface of the pipe and the upper surface of the support lie adjacent to one another. Thus, this region becomes a particular site for likely corrosion over time as a result of environmental effects.

Second, physical and mechanical contact between the support and the contacted surface on the pipe can damage by mechanical action over time any anti-corrosion paint or other coating applied to the external surfaces of the pipes in the contact region. In particular, stresses and strains tending to cause relative movement of the respective surfaces, for example by differential expansion or contraction due to changes of ambient or carried fluid temperature, physical movement of the pipeline as a result of internal or external forces etc, can produce sliding between the pipe surface and the support at the point of contact, exacerbating any mechanical damage which might be caused to an anti-corrosion coating on the pipe surface.

These effects combine to tend to produce a particularly corrosion-susceptible site in the region of contact between the support and the lower surface of the pipe seated/clamped thereon.

GB2175667A describes a support structure for a pipe having a number of the above characteristics, which purports to mitigate some of the indicated problems. A support structure includes a convex plate made of corrosion-resistant material fitted to and in contact with a lower part of the outer surface of a pipe with the interposition of a layer of anti-corrosive adhesive material which adheres the support plate to the pipe.

The use of a bonding agent to adhere the support plate to the pipe in this manner is not considered to be desirable on thermal and/or ambient pipework for a number of reasons.

Amongst the problems that can arise in such a system are that:

the bonding agent may be affected by heat causing the bond to tend to act as a lubricant allowing for slippage;

the bonding agent may become brittle over time and tend to delaminate from the steel surfaces;

the bonding agent requires direct bonding to the steel pipe, so additional protection cannot be provided, and the result is that the steel of the pipe surface is exposed if the bond fails;

if the bond does fail this may result in a capillary action between the pipe and the bond exacerbating the corrosion problem by creating a pocket trap effect;

the solution is unsatisfactory because it requires the pipe to be directly modified in situ.

SUMMARY

The invention is directed at the provision of a pipe support structure and a method of supporting a pipe which acts to mitigate corrosion effects, and in particular which mitigates at least one or more of the above disadvantages of prior art systems.

Thus, in accordance with the invention in a first aspect there is provided a pipe support structure comprising a support member defining a support surface, and a plurality of pipe support elements; wherein the support surface defines a plurality of grooves each correspondingly sized and shaped to receive a respective one of the pipe support elements, with the pipe support element being sized to project beyond its groove when so received.

Thus, with a support member configured in the manner above described, with each of a plurality of pipe support elements respectively received in a complementary groove, it is an upper surface of each pipe support element where the pipe support element projects beyond its groove that makes contact in use with a corresponding surface of a pipe to be supported. For example, each pipe support element may define an upper surface suitably shaped to effect face-to-face contact with a complementary adjacent surface of a pipe during use. The pipe is supported for example by being seated in face-to-face contact with an upper surface of each support element under the action of gravity and/or by being clamped thereon.

The support member may otherwise in familiar manner be generally shaped to receive a pipe, and suitably supported, for example above a ground and/or other surface along which a pipeline run is to be deployed, for example via suitable support legs. The support member may be fabricated from materials familiar for such application to the person skilled in the art, such as structural steel or the like.

However, the support member is distinctly characterised by the provision of discrete pipe support elements which are located in use within complementarily shaped grooves in the support surface of the support member, so as to project beyond the support surface when so received, and thereby to make primary contact with a pipe when the pipe is received within and supported by the support member during use.

The major part of the formation of the support member is thus of a suitable conventional structural material such as structural steel or the like, and retains all the conventional advantages of such a structure. However, the immediate intimate contact is made between the pipe and the plurality of pipe support elements that project outwardly beyond the surface of the support member, with the surface of the pipe spaced apart from the surface of the support member itself. This allows the support elements to be fabricated from an alternative material particularly selected with the problems identified hereinabove in mind, and with the intention of mitigating those problems.

For example, to mitigate any corrosion effect, the pipe support elements may be fabricated from and/or coated with a corrosion-resistant material, such as a suitable polymeric material. In this context a material can be seen as corrosion-resistant if it tends to be more resistant, and especially tends to be significantly more resistant, to corrosion than is the bulk material of the support member. In particular in this way, electrolytic or galvanic corrosion between dissimilar metals making up the pipeline and support plate may be eliminated.

Similarly, the support elements may be fabricated from and/or coated with a relatively low friction material, such as a suitable polymeric material. In this context a material can be seen as low friction if it tends to have a lower static coefficient of friction, and especially tends to have a significantly a lower static coefficient of friction, than that of the bulk material of the support member.

The composite construction allows selection of different application-specific appropriate materials for the principal structural component of the support member and for the pipe support elements making contact with the pipe, to mitigate effects attributable to prior art support and clamping systems, such as a tendency to damage the external surfaces of the pipes and in particular anti-corrosion coatings thereon, a tendency to create sites for accumulation of sources of corrosion from the environment, such as water or saline solutions, and a tendency to cause mechanical damage at the site of contact. A number of the problems identified in the prior art simple plate supports can be simply and effectively mitigated, without the attendant disadvantages of the use of a system based on adhesive bonding such as has been suggested for example by GB2175667.

Each of the plurality of support elements is shaped and sized to be received within and thereby project beyond a complementary recessed portion in the support surface of the pipe support member. These support elements may optionally be removably insertable therein, for example for repair or replacement.

Support elements may be provided in identical or multiply different configuration. Conveniently, each pipe support element may be identically configured, or at least configured to project to the same extent beyond its respective groove, so that each of the plurality of support elements makes corresponding face-to-face contact with a surface of a pipe received therein in use.

In a convenient embodiment, the support member comprises an elongate structure defining an elongate direction lying generally parallel to an axial direction of a pipe in use, and comprises a plurality of grooves successively arrayed along the support surface in the elongate direction.

Conveniently, the plurality of grooves may be identically sized and shaped to receive correspondingly identical complementarily shaped insertable pipe support elements. Conveniently, the grooves may be evenly distributed along the length of the support surface of the pipe support element.

In general, it is respective outer surfaces of each of the plurality of pipe support elements, being the outermost surfaces of the portions of the said elements projecting beyond their respective grooves and beyond the support surface of the support member, that collectively define a pipe contact surface in use adapted for face-to-face contact with a surface of a pipe. The pipe contact surface defined by the respective outer surfaces of each of the plurality of pipe support elements has the further advantage of distributing the load effectively across the area of the pipe support structure, thus mitigating the detrimental mechanical effect that might arise in particular with respect to a coating from a more concentrated or single point contact.

The pipe contact surface as so defined should be complementarily sized and shaped with respect to an outer surface of a pipe section with which it is intended to be used. For example, in the typical case of a cylindrical pipe section, the pipe contact surface as so defined may be concave, and in particular may comprise an arcuate surface of corresponding curvature to that of the surface of the cylindrical pipe section into which it is to be brought into face-to-face contact in use.

The support member is conveniently similarly shaped, for example again having a concave shape, and for example a generally correspondingly arcuate structure, with a plurality of arcuate grooves arrayed therealong for example perpendicular to an elongate direction.

It is a particular characterising feature of the invention that the individual support elements can be selected for distinct desirable properties from that of the principal structural support member, and consequently the surface properties of the contact surface that they define can be similarly so selected.

Desirable properties include, without limitation, high stiffness, low friction (for example a static coefficient of friction below 0.10 and for example below 0.05), good dimensional stability, resistance to corrosion and environmental attack, high abrasion resistance, low water absorption etc.

The material from which a pipe support element is fabricated is selected for and/or provided with a coating selected for one or more of the foregoing properties.

In a particularly preferred embodiment, a pipe support element is fabricated from a polymeric material, which is for example a suitable engineering polymer, and in particular an engineering thermoplastic material.

Suitable materials for fabrication of the pipe support element and/or of a coating thereof applied at least on an outer contact surface of the projecting portion that projects beyond its respective groove might include without limitation: acrylonitrile butadiene styrene, polyamides, polycarbonates, polyaryletherketones, polyimides, polysulfones, polyphenol sulfides, polyphenol oxides, polytetrafluoroethylene, polyacetals and similar high performance engineering thermoplastics.

Suitable materials may be selected depending upon the particular requirements of the job.

In a particular embodiment, support elements are provided comprising polyoxymethylene or polytetrafluoroethylene.

In a possible embodiment of the invention, the pipe support member may be disposed in use to present an upwardly presenting support face to receive in use a pipe which seats thereon. Thus, a lower part of the pipe in use sits in face-to-face contact with the presented contact surfaces of the plural support elements contained within such a support member, which may then be stably retained in contact with the ground or other generally horizontal surface, for example by the provision of suitable support legs.

This horizontal embodiment is only an example. The principles of the invention could readily be applied to the provision of a support structure for a pipeline section disposed otherwise than horizontal.

The contact surfaces of the plural support elements make contact in use with a pipeline section supported thereon. The invention may further comprise mechanical fixings such as clamps adapted in use to hold a pipeline section in position against the contact surfaces of the plural support elements and for example to urge the pipeline section into loading engagement against the contact surfaces of the plural support elements. Additionally or alternatively the structure may be so configured that the weight of a pipeline section tends to hold the pipeline section in position in use against the contact surfaces of the plural support elements and for example to urge the pipeline section into loading engagement against the contact surfaces of the plural support elements.

The support member comprises a plurality of grooves for receiving a plurality of support elements, but may otherwise define a continuous surface. However, in a preferred embodiment the support member may be provided with one or more suitably spaced and positioned through-thickness apertures, for example to facilitate inspection of the pipe surface therethrough, and/or to provide access for testing in situ, for example ultrasonically, and/or to assist in the drainage/prevent the accumulation of water etc which might otherwise pool therein and potentially exacerbate the tendency for corrosion.

Such through apertures may comprise circular holes, slotted portions etc.

Having in mind the facilitation of drainage from an area between the support member and the pipe where it might otherwise pool, aperture portion(s) might preferably be provided within the support member generally at a point lowermost therein when the support member is located in position. For example, plural apertures are provided successively arrayed in an elongate direction in the lowermost part of a concave support member. Alternatively, a continuous slot may similarly be provided.

Through apertures in the support member may be provided in the ungrooved portion thereof to provide direct through access from externally of the support member to a pipe in situ therein. Alternatively, if apertures are provided in the grooved portion, complementary apertured portions must also be provided in the pipe support elements at that point. To effect this, support elements may include slots or holes complementarily shaped with those in the support member, or may be provided in multiple parts to define gaps corresponding to the apertures in the support member.

Although for drainage purposes the most convenient place for an aperture might be at the lowermost part of the support member, alternative arrangements might be appropriate. For example, to have a part of the pipe circumference inspected or to provide access for testing at two orthogonal points instead of a single point, suitably displaced plural apertures may be provided.

In accordance with a further aspect of the invention there is provided a pipeline assembly comprising a plurality of pipe sections assembled end-to-end together, with at least some of the said pipe sections being supportingly received by a pipe support structure in accordance with the first aspect of the invention.

The advantages of the invention may accrue in particular in an embodiment where a pipe section is fabricated from metallic material and is for example pipeline steel or another similarly potentially corrodible material. Such a pipe section may be given a corrosion-resistant surface coating such as a corrosion-resistant paint. The principles of the invention reduce any wear effects and associated tendency to exacerbate corrosion at the contact region where the pipeline is supported.

The pipeline assembly is supported by a plurality of support structures in accordance with the first aspect of the invention each supportingly receiving a pipe section and other preferred features will be understood by analogy.

In accordance with the invention in a further aspect there is provided a method of supporting a pipe comprising the steps of:

providing a support structure comprising a support member defining a support surface, and a plurality of pipe support elements, wherein the support surface defines a plurality of grooves each correspondingly sized and shaped to receive a respective one of the pipe support elements, with the pipe support element being sized to project beyond its groove when so received;

locating each of the pipe support elements in its respective groove;

supportingly receiving a pipe within the support structure.

Thus, it is an upper surface of each pipe support element where the pipe support element projects beyond its groove that makes contact with a corresponding surface of the pipe. This allows the support elements to be fabricated from a material particularly selected with the problems identified hereinabove in mind, and with the intention of mitigating those problems. The main load is carried by the support member which may be fabricated with that application in mind. The attendant advantages discussed above are available if a pipe is supported by such a method with appropriate materials selection.

The method is a method of deploying a support structure in accordance with the first aspect of the invention to supportingly receive a pipe and other preferred features will be understood by analogy.

More completely, the method comprises method of assembly of a pipeline, comprising:

assembling a plurality of pipe sections end-to-end together;

supporting at least some of the said pipe sections in accordance with the foregoing method.

The invention will now be described by way of example only with reference to FIGS. 1 to 3 of the accompanying drawings, in which:

DETAILED DESCRIPTION

Figure 1:
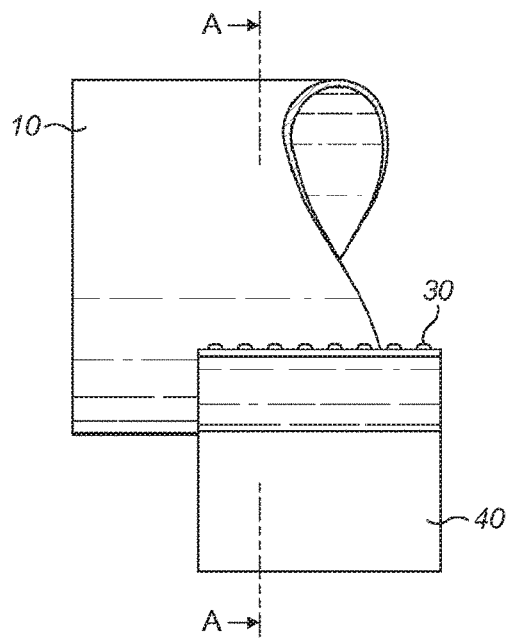
FIG. 1 is a side view of a partially cut away pipe section received on a support in accordance with the invention.
Figure 3:
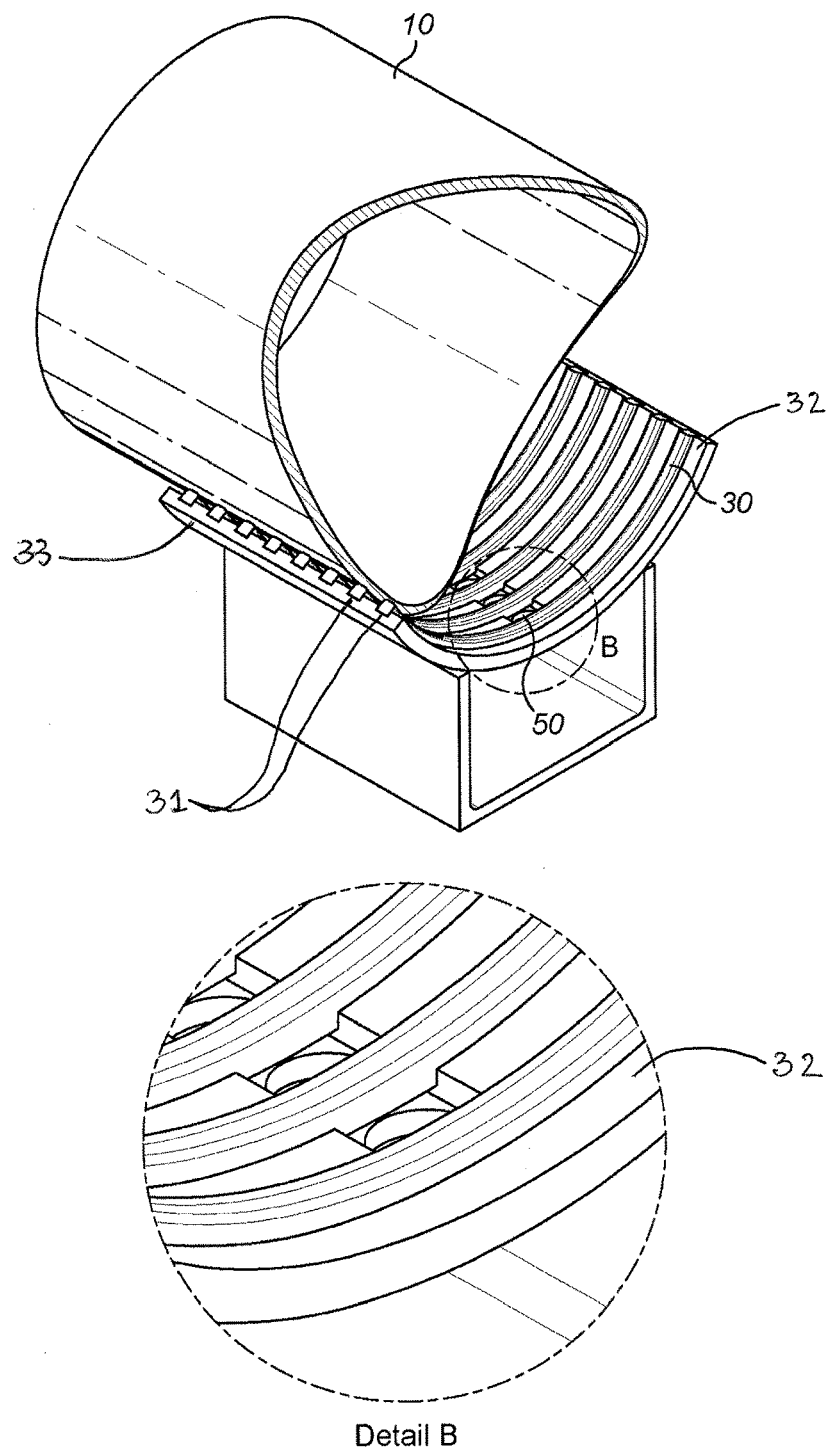
FIG. 3 is an isometric projection of the arrangement of FIG. 1 with additional inset detail.

The figures illustrate a supported pipeline section 10, shown crosscut for clarity in FIGS. 1 and 3. The pipeline section comprises a cylindrical wall of pipeline steel. An outer surface coating comprising a corrosion-resistant paint (not specifically shown in the figures) is applied in familiar manner.

The pipeline section is shown supported, for example as it would be on the ground or other typically horizontal surface, by a support structure embodying the principles of the invention. This illustration is by way of example only. The principles of the invention could readily be applied to the provision of a support structure for a pipeline section disposed otherwise than horizontal.

The support structure comprises a principal structural support body 20 of suitable structural material and for example similar structural steel to that of the pipeline, formed as an arcuate plate with a concave upper surface 32 shape generally corresponding in curvature to that of the cylindrical pipe section, with a lower surface 33 opposing the concave upper surface 32 and supported on the ground or other surface by the ground or other surface engaging support section 40. The general principles of this structural part of the pipe support system embody general principles familiar in the art.

Where the support structure of the embodiment of the invention is distinctly characterised over such examples familiar in the art is in the provision of high-load non-metallic segments 30 inserted into grooves 31 in the upper surface 32 of the support plate 20. These high load non-metallic segments are shaped to project beyond the upper surface of the plate, and make actual contact with the lower surface of the pipe section. In the embodiment the pipeline section 10 is shown supported horizontally. In such a configuration the pipeline section 10 may be received within the support body 20 and engage upon the high-load non-metallic segments 30 under the load created by the weight of the pipeline section. Additionally or alternatively (and for example in particular in alternative arrangements where a pipeline section is disposed otherwise than horizontal) mechanical fixings such as clamps may be provided to hold a pipeline section in position against the high-load non-metallic segments.

Thus, it is possible to select the material properties of the insertable segments to be specifically directed to the particular issues raised at the point of contact with the pipe, to mitigate any effect attributable to a tendency of the support at the contact site to damage the external corrosion-resistant coating of the pipe and/or to otherwise exacerbate any corrosion problems at the contact site. The material for the segment may in particular be selected for low friction and good resistance to corrosion for instance, and is for example fabricated from a suitable engineering thermoplastic material. Many different plastics could be used for the insertable segments depending on the particular requirements of the pipeline system and environment in which use is intended. In the example embodiment the segments are fabricated from polyoxymethylene or polytetrafluoroethylene.

The principal advantages of a structure such as illustrated in the figures are attributable to the use of the insertable segments. These present a low friction surface for the contact between the support and the outer surface of the pipe, reducing the tendency for damage to occur to the outer surface coating at the point of contact. Additionally, because the segments 30 project beyond the surface of the structural steel plate 20 itself, they create a point of contact which tends not to be a corrosion site.

Any tendency for moisture to accumulate is likely to be on the surface of the plate itself 20 and thus the pipe is spaced to some extent away from this accumulated moisture site, and its potentially corrosive effect. In the illustrated embodiment, this effect is further enhanced by the provision of drainage holes 50 where water would most likely pool at the lowermost point in the support plate. The holes 50 are shown in the embodiment in a line along the base of the pipe, with a drainage application in particular in mind, but could be otherwise arranged to suit alternative needs, for example to have a part of the pipe circumference inspected or to provide access for testing at two orthogonal points.

In the illustrated embodiment, holes 50 are provided through the plate 20 in its ungrooved sections, and the insertable elements are shown each as a single continuous component. In an alternative arrangement (not shown) the insertable elements could be in two pieces with a gap between them to facilitate a slot being cut at the base of the curved section of the plate to enable a continuous length of the pipe to be made accessible to a probe and/or to perform a drainage function if desired.

By providing a composite support comprising a separate primary structural member in the form of the plate 20 and insertable contact elements in the form of the inserts 30, and thereby allowing different material selection for the two components based on their respective particular applications, the composite pipe support structure addresses many of the problems identified in prior art simple plate supports in admirable manner, without the attendant disadvantages of the use of a system based on adhesive bonding such as has been suggested for example by GB2175667.

Figure 2:
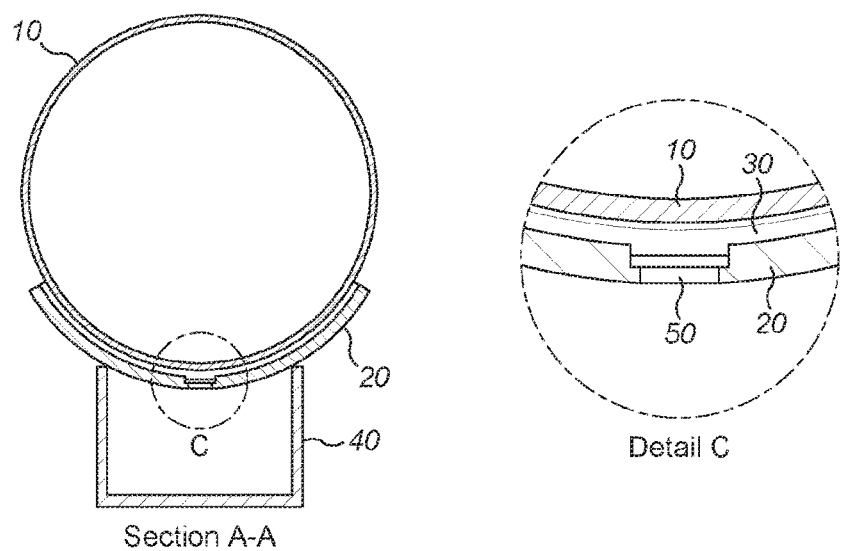
FIG. 2 is a cross-section through the view of FIG. 1, with additional inset detail.
Figure 4:
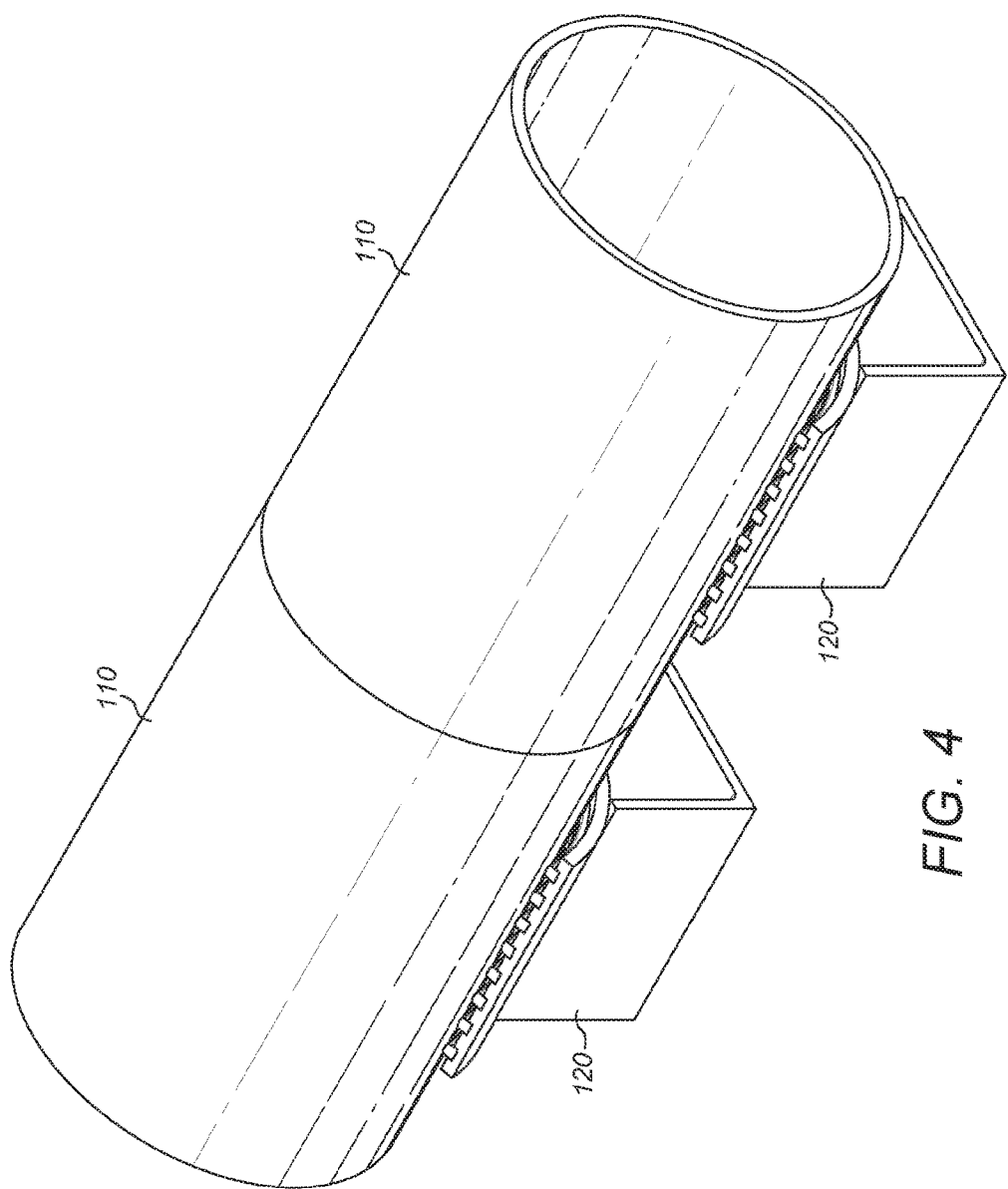
FIG. 4 is an illustration of a length of pipeline comprising two lengths of pipe each supported on a respective support in the manner of FIGS. 1 to 3.

Suitable lengths of pipeline can be built up in familiar manner whereby plural pipe sections are assembled end-to-end together, with at least some of the said pipe sections being supportingly received by a pipe support structure in accordance with the invention. FIG. 4 is an illustration of a length of pipeline assembly comprising two lengths of pipe 110 joined end-to-end together and for example butt welded, each supported on a respective support 120 in the manner of FIGS. 1 to 3. Multiple such lengths of pipe joined end-to-end together provide a pipeline of desired length in the usual manner, with at least some of the lengths of pipe being supported as shown.

The invention claimed is:

1. A pipe support structure comprising:
a support member comprising: a length that extends in a longitudinal direction a lower support surface, an upper support surface that is opposite to the lower support surface and a plurality of grooves formed in the upper support surface, wherein the plurality of grooves are arranged to intersect the longitudinal direction of the support member; and
a plurality of pipe support elements, wherein
each of the pipe support elements is disposed in a respective one of the plurality of grooves formed in the upper support surface so as to project beyond the upper support surface.

2. The pipe support structure of claim 1, wherein the support member is configured to support a pipe with the upper support surface of the support member facing the pipe and the support member is supported by one or more support legs on a surface along which a pipeline run is deployed.

3. The pipe support structure of claim 1, wherein the support member is fabricated from structural steel.

4. The pipe support structure of claim 1, wherein the pipe support elements include a corrosion-resistant material that is more corrosion-resistant than a material of the support member.

5. The pipe support structure of claim 1, wherein the pipe support elements include a relatively low friction material that has a lower static coefficient of friction than a material of the support member.

6. The pipe support structure of claim 1, wherein the pipe support elements include a polymeric material.

7. The pipe support structure of claim 6, wherein the pipe support elements include an engineering thermoplastic material.

8. The pipe support structure of claim 6, wherein the pipe support elements include a material that includes at least one of: acrylonitrile butadiene styrene, polyamides, polycarbonates, polyaryletherketones, polyimides, polysulfones, polyphenol sulfides, polyphenol oxides, polytetrafluoroethylene, polyacetals and similar high performance engineering thermoplastics.

9. The pipe support structure of claim 8, wherein the pipe support elements include at least one of polyoxymethylene and polytetrafluoroethylene.

10. The pipe support structure of claim 1, wherein the support member comprises
an elongate structure extending in an elongate direction, wherein
the plurality of grooves are successively arrayed along the upper support surface in the elongate direction.

11. The pipe support structure of claim 10, wherein the plurality of grooves are each identically sized and shaped to each other and the plurality of pipe support elements are each identically sized and shaped to each other.

12. The pipe support structure of claim 10, wherein the plurality of grooves are evenly distributed along a length of the upper support surface of the support member.

13. The pipe support structure of claim 1, wherein the upper support surface of the support member is configured to support a pipe.

14. The pipe support structure of claim 1, wherein the support member includes one or more through-thickness apertures.

15. A pipeline assembly comprising:
a plurality of pipe sections that are assembled together end-to-end and supported by a plurality of pipe support structures, each comprising a support member that comprises: a length that extends in a longitudinal direction, a lower support surface, an upper support surface that is opposite to the lower support surface and a plurality of grooves formed in the upper support surface, and a plurality of pipe support elements, wherein the plurality of grooves are arranged to intersect the longitudinal direction of the support member, each of the pipe support elements is disposed in a respective one of the plurality of grooves formed in the upper support surface so as to project beyond the upper support surface.

16. The pipeline assembly of claim 15, wherein each pipe section is fabricated from metallic material and the metallic material is pipeline steel.

17. The pipeline assembly of claim 15, wherein each pipe section has a corrosion-resistant surface coating.

18. A method of supporting a pipe comprising:
providing a support structure comprising:
a support member comprising: a length that extends in a longitudinal direction a lower support surface, an upper support surface that is opposite to the lower support surface, and a plurality of grooves formed on the upper support surface, wherein the plurality of grooves are arranged to intersect the longitudinal direction of the support member; and
a plurality of pipe support elements;
locating each of the pipe support elements in a respective one of the plurality of grooves formed in the upper support surface so as to project beyond the upper support surface; and
disposing a pipe on the support structure, wherein the pipe is contactingly supported by interfacing with the pipe support elements located in the plurality of grooves.

* * * * *